United States Patent
Gebhart

(10) Patent No.: US 8,782,877 B2
(45) Date of Patent: Jul. 22, 2014

(54) METHOD FOR PRODUCING CLUTCH AND BRAKE DISKS FOR ELECTROMAGNETIC CLUTCHES OR ELECTROMAGNETIC BRAKES HAVING AT LEAST ONE FRICTION SURFACE ELEMENT

(75) Inventor: Manfred Gebhart, Constance (DE)

(73) Assignee: Kendrion Linnig GmbH, Markdorf (DE)

( * ) Notice: Subject to any disclaimer, the term of this patent is extended or adjusted under 35 U.S.C. 154(b) by 164 days.

(21) Appl. No.: 13/265,952

(22) PCT Filed: Jan. 15, 2010

(86) PCT No.: PCT/EP2010/000183
§ 371 (c)(1),
(2), (4) Date: Dec. 7, 2011

(87) PCT Pub. No.: WO2010/121677
PCT Pub. Date: Oct. 28, 2010

(65) Prior Publication Data
US 2012/0096704 A1    Apr. 26, 2012

(30) Foreign Application Priority Data
Apr. 24, 2009   (DE) .................. 10 2009 018 559

(51) Int. Cl.
*H02K 15/02* (2006.01)
*H02K 15/10* (2006.01)

(52) U.S. Cl.
USPC ...... 29/598; 29/592.1; 29/602.1; 192/84.951; 192/84.961

(58) Field of Classification Search
USPC ........ 29/598, 602.1, 607; 192/109 R, 84.951, 192/84.961
See application file for complete search history.

(56) References Cited

U.S. PATENT DOCUMENTS

| | | | | |
|---|---|---|---|---|
| 5,123,166 A | * | 6/1992 | Kanemitsu et al. | 29/892.3 |
| 5,448,832 A | * | 9/1995 | Kanemitsu et al. | 29/892.2 |
| 5,642,560 A | * | 7/1997 | Tabuchi et al. | 29/607 |
| 5,651,181 A | * | 7/1997 | Shohara et al. | 29/892.3 |
| 5,762,173 A | * | 6/1998 | Nishimura | 192/84.961 |
| 5,924,537 A | * | 7/1999 | Tobayama et al. | 192/84.961 |
| 6,031,309 A | * | 2/2000 | Nishimura | 310/92 |
| 6,409,004 B1 | | 6/2002 | Kawada et al. | |
| 2003/0051961 A1 | | 3/2003 | Yasui et al. | |
| 2003/0164277 A1 | | 9/2003 | Matsui et al. | |

FOREIGN PATENT DOCUMENTS

| | | |
|---|---|---|
| EP | 1116895 A1 | 7/2001 |
| GB | 769162 | 2/1957 |

* cited by examiner

*Primary Examiner* — Paul D Kim
(74) *Attorney, Agent, or Firm* — Bachman & LaPointe, P.C.

(57) ABSTRACT

A method for producing clutch and/or brake friction disks for electromagnetic clutches and/or electromagnetic brakes having at least one friction surface element through which the magnetic field flows, wherein at least one circular slot is cut by lathe machining in the friction surface element from a friction contact surface, and wherein at least two webs which connect a pole surface ring to the remaining/other friction surface element are made in the friction surface element from that side which is opposite the friction contact surface such that the slots which are cut from the friction contact surface are interrupted remote from the webs to form continuous air gaps.

11 Claims, 2 Drawing Sheets

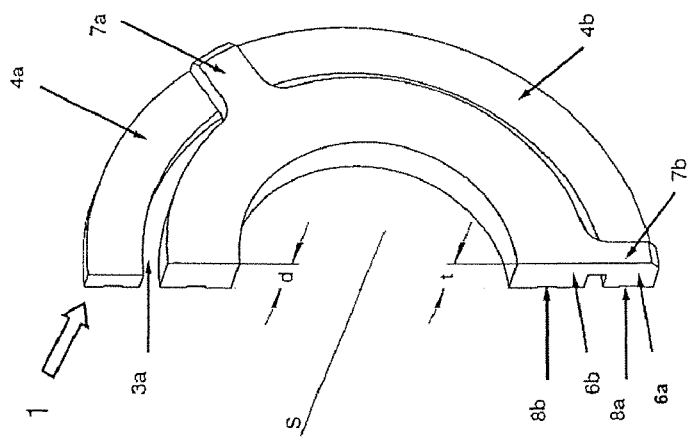
Fig.1.a
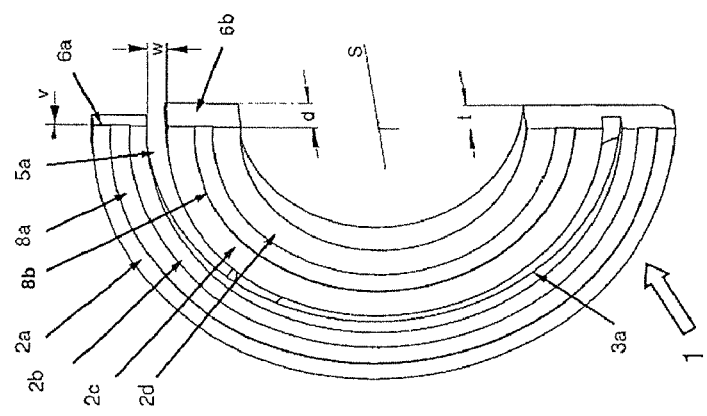
Fig.1.b

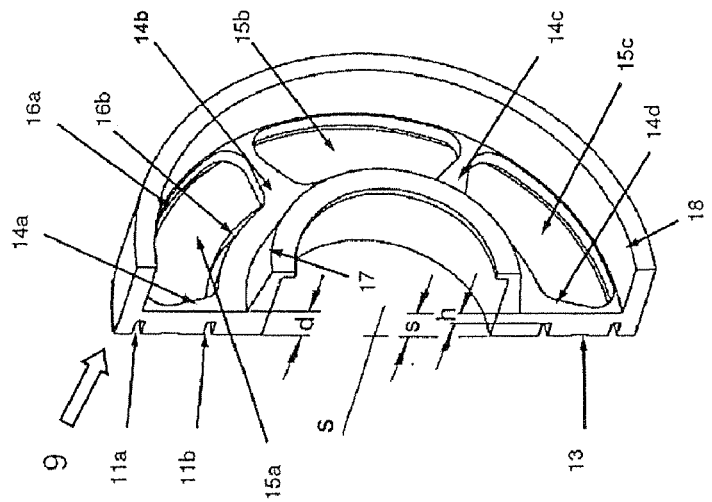
Fig.2.a
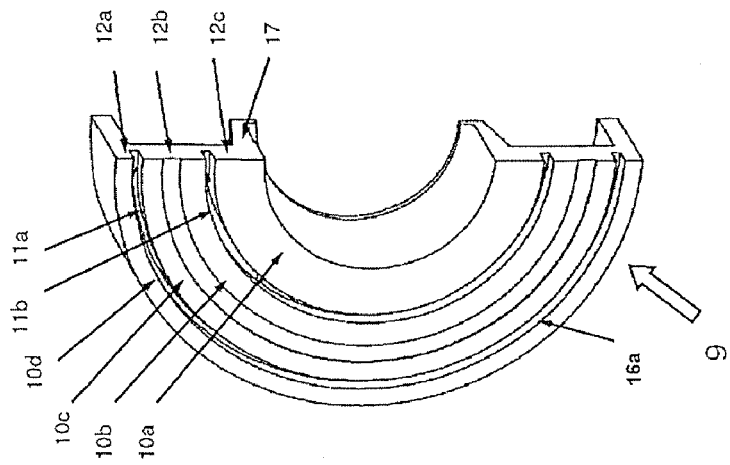
Fig.2.b

METHOD FOR PRODUCING CLUTCH AND BRAKE DISKS FOR ELECTROMAGNETIC CLUTCHES OR ELECTROMAGNETIC BRAKES HAVING AT LEAST ONE FRICTION SURFACE ELEMENT

BACKGROUND OF THE INVENTION

The invention relates to a method for producing clutch and/or brake disks for electromagnetic clutches and/or electromagnetic brakes having at least one friction surface element through which the magnetic field flows.

In accordance with the various designs of friction surface elements, for example rotors and armature disks, in electromagnetic clutches or electromagnetic brakes, a series of different methods for producing said friction surface elements has already been proposed. For the purpose of economical production, the design of a friction surface element is often tailored to have the fewest possible parts which make up said friction surface element. For example, friction surface elements which are composed substantially or entirely of soft-magnetic sheet steel are converted into a shape which corresponds to their function by a combination of stamping and extrusion. In order to increase the friction forces, a plurality of slots in the form of an arc of a circle are stamped or cut out of the metal sheet in order to thus delimit a plurality of concentric pole surfaces. Integral friction surface elements can also be produced by all functional geometric structures being formed substantially by casting of the component. Subsequent method steps serve only to achieve the desired accuracy of the final dimensions of the component, with the result that only relatively small quantities of material still have to be removed.

SUMMARY OF THE INVENTION

The object of the present invention is to produce magnetizable friction surface elements, as are used as friction disks in electromagnetic clutches and brakes, in a simple and cost-effective manner while not having an adverse effect on the magnetic guidance properties.

This object is achieved by the invention disclosed herein. In this case, the method can advantageously be adapted to virtually all dimensions and geometries of the friction surface element which are relevant in practice. The method is suitable, in particular, for producing a plurality of variants of this friction surface element or for relatively short production series.

The disclosure also specifies additional dependent claims specify advantageous and expedient developments of the invention.

The invention proceeds from a, for example, flat cylindrical ring disk, one side of said ring disk being intended to be a friction surface and the surface having been smoothed, for example by lathe machining or grinding, for this purpose. In order to be able to magnetically attract the friction surface of a second friction surface element to the first-mentioned surface, at least two concentric pole regions are magnetically delimited from one another. The essence of the invention is that at least one circular slot is cut by lathe machining in the friction surface element from a friction contact surface. In particular, the cut of the circular slot extends only up to a fraction of the material thickness of the disk blank, for example half the disk thickness. The lathe machining affords the advantage that slots which are relatively narrow in comparison to the depth of said slots can be produced. As a result, the remaining friction surface is only slightly reduced by the magnetic delimiting of the pole regions.

Since the workpiece is machined only from one direction during the lathing process, with the material which is removed being transported away in the opposite direction, the thickness of the material which is not cut does not affect the machining. This affords the advantage that there is no upper limit for the height of the starting cylindrical shape.

The guide path of the cutting tool can deviate from a guide direction parallel to the rotation axis during lathe machining. This affords the advantage that a circular slot with a radial cross-sectional profile can be cut, it being possible for this to differ from the shape of a rectangle and to correspond, for example, to a trapezoidal shape.

The circular slots can be cut with a high degree of geometric accuracy on account of the continuously rotating working movement during the lathing operation. In this case, the slots are bounded by walls with a low level of surface roughness. This has proven advantageous for the production of the friction surface elements in as much as the magnetic flow through the pole surfaces is hardly adversely affected by stray flux within the slots despite a low slot width, and the risk of cracks forming is reduced.

An inherent feature of the invention is that the slots are cut in the pole surface along the entire circumference of the circle. Therefore, material bridges are not left between the pole surfaces in the vicinity of the friction contact plane. This prevents non-uniformities in the magnetic field profile and non-uniform friction forces along the edges of the pole surfaces. Accordingly, irregular wear is largely avoided or minimized.

In contrast to machining, for example, with a laser, lathe machining affords the further advantage of a lesser thermal action on the remaining material in the vicinity of the machining zone. Undesired side effects, for example hardening of the edge zone and the accumulation of molten materials in undesirable locations, are therefore advantageously avoided.

In an advantageous embodiment of the invention, the axial thickness of magnetically isolated parts of the friction surface element is determined at least for the most part or predominantly by the lathed slot. The magnetic properties of the disk material can be used to ascertain dimensions for the friction surface element which optimally match the magnetic and mechanical requirements to the component. On account of its accuracy, lathe machining can advantageously be matched to the geometry of a friction surface element which is dimensioned in this way, for the purpose of quick and material-saving machining.

In a further advantageous embodiment of the invention, the magnet isolation of adjacent parts of the friction surface element in the radial direction is generated substantially by the space in the cut slot, which space is singly contiguous in the axial direction from the friction contact surface as far as the webs. The distance, which is created in this way, between the friction contact surface and magnetically conductive connections between the parts of the friction surface element effectively reduces the influence which magnetic bridges can have on the bundling and guidance of the magnetic flux in the vicinity of the pole surfaces. Therefore, the magnetic attraction force is advantageously increased and the frictional connection for the transmission of torque is improved.

It is also preferred for a friction surface element to be partially cut out from the rear face. In this case, cutouts with a relatively large, contiguous material volume are removed, for example with the aid of a coarse milling tool, for the purpose of shortening the machining time. In particular, the material which firstly is not required for the mechanical stability of the friction surface element and secondly, on account of its soft-magnetic property as undesirable magnetic bridges, short circuits the magnetic flux remote from the pole surfaces is removed in the process. Furthermore, this can reduce the weight of the component to a required extent and, moreover, the friction surface element can be matched to spatial conditions at its site of installation.

In a further advantageous application of the invention, a cutout from the rear face penetrates so far that the material of the friction surface element is interrupted as far as the cut slot. The slot therefore forms air gaps in these regions, said air gaps extending continuously in the axial direction from the plane of the pole surfaces or friction contact surfaces as far as the rear face of the friction surface element. This effectively increases the magnetic resistance between the adjacent pole surfaces which are separated by the slot. The degree of efficiency of the electromagnetic clutch or brake can be accordingly improved. Since the component is machined from that side which is opposite the friction contact plane in this method step, different methods and tools can be used for the machining on the side of the friction contact surfaces, irrespective of the accuracy requirements.

The invention can preferably be applied such that a second concentric circular slot is cut in the friction contact surface of a friction surface element by lathe machining, with the result that a magnetically isolated pole surface ring is formed between the radially outermost pole surface and the innermost pole surface. By suitably arranging magnetic resistors in the active opposite friction surface element, the magnetic flux can be forced through said friction surface element, in order to pass through relatively large surface regions of the pole surfaces in a virtually perpendicular manner, with the result that the force-fit connection on the friction contact surface is increased. In this case, the accuracy of lathe machining proves to be advantageous on account of it also being possible to carry out this step with friction surface elements with a relatively small diameter in comparison to other methods.

In a particularly preferred variant of the method according to the invention, so much material is removed on that side of the same friction surface element which is opposite the friction contact surface that a plurality of, in particular still only two, radially running webs connect the pole surface ring to the other friction surface element. This affords the advantage that only the material which either ensures optimal guidance of the magnetic flux or is required for the mechanical stability and reliability of the friction surface element still remains on a friction surface element. Since the pole surface ring, with the exception of the connecting webs, is separated from the adjacent pole surfaces by air gaps and the connecting webs themselves do not reach the plane of the friction contact surface, the method advantageously allows for the pole surface ring to be magnetically isolated within its friction surface element. This assists the multiple change in the magnetic flux in the radial direction between two active friction surface elements and advantageously additionally increases the attraction force between two friction surface elements.

It is further preferred for the circular slots which separate the pole surfaces from one another to be produced with a uniform depth. This has the effect of the magnetic field lines in the plane of the friction contact surface along the circular slots changing only slightly and hardly being influenced by the magnetic short circuit which is formed by the remaining webs. This affords the advantage that an extremely uniform action of force prevails over the entire surface of a pole surface ring, as a result of which the risk of wear on just one side is reduced.

In a particularly advantageous embodiment of the method according to the invention, material is removed, for example by lathe machining, from that side of a friction surface element which is opposite the friction contact surface. As a result, an inner and an outer cylindrical wall can advantageously be formed in the axial direction. In this case, the outer casing surface of the inner wall and the inner casing surface of the outer wall, in particular, are made such that the turns of a solenoid with which the clutch and/or the brake is operated run between said surfaces without making contact with them. Recesses for producing the web elements are then made by milling.

It is also advantageous for the physical geometric structures of a friction surface element, which structures are opposite the friction contact surface, to be pre-formed in a blank with a protruding volume of material by means of casting and/or forging. This allows wear of the tool to be reduced and the machining times to be shortened during removal of material for the final shaping of the component. In particular, shaping the blank by forging is advantageous because the load-bearing ability of the friction surface element can be increased and the risk of cracks forming can be reduced as a result of said forging.

It is also preferred for the material thickness of the pole surface rings to be reduced in one region by lathe machining from the friction contact surface, with the region being positioned so as to at least partially overlap a pole surface slot in a friction contact surface of a friction surface element, which is arranged opposite, as viewed in the axial direction. In this case, it is advantageous when only so much material is removed by lathe machining that a predefined flow-through cross section in the radial direction for the magnetic flux is not exceeded. In this case, the bundling and guidance of the magnetic flux are improved, with the result that the magnetic attraction force in the region of the pole surfaces is increased. It is particularly advantageous when a region of this kind of reduced material thickness extends over a radial extent which exactly overlaps a slot in the second co-acting friction surface element. As a result, the magnetic flux is particularly effectively guided and, at the same time, the surface portion, which is available for frictional contact, in the friction contact surface is optimally utilized.

BRIEF DESCRIPTION OF THE DRAWINGS

The production of the friction surface elements for an electromagnetic clutch is described below with reference to the figures as an example of the implementation of the method according to the invention. The exemplary clutch has a rotor and an armature disk as the friction surface elements. The installation and the design of the drive or output of said clutch are not illustrated here. The pole surfaces at the same time take on the function of the friction contact surfaces in the case of both friction surface elements.

IN THE DRAWING

FIG. 1a shows a perspective view of a halved armature disk looking at the friction contact surface, FIG. 1b shows a perspective view of the halved armature disk from the rear with respect to the friction contact surface, FIG. 2a shows a perspective view of a halved rotor looking at the friction contact surface FIG. 2b shows a perspective view of the halved rotor from the rear with respect to the friction contact surface.

DETAILED DESCRIPTION

FIGS. 1a and 1b illustrate an armature disk 1 which has been produced in accordance with the method according to the invention. The process for production of said armature disk is preferably started from a blank in the form of a cylindrical disk ring, for example by stamping or casting. One side of the disk ring is prepared as a friction contact surface, for example by lathe machining, with the result that the material thickness corresponds to the thickness d.

The armature disk 1 has a friction contact surface 2a-2d. A circular slot 3a is cut in the direction of the cylinder axis by lathe machining from a plane of the friction contact surface 2a-2d. Two pole surface rings 6a, 6b are defined as a result. The slot 3a is formed at a predetermined depth t of the disk volume, said depth corresponding to approximately half the thickness d of the disk ring in this case. The radial cross section of the slot describes a rectangle, with the shorter side of the rectangle corresponding to the width w of the slots. The regions of the recessed portions 8a, 8b can be seen between the pole surfaces 2a, 2b and 2c, 2d at the pole surface rings 6a, 6b, said regions serving for improved guidance of the magnetic flux.

FIG. 1b shows the rear of the armature disk 1 after the cutouts 4a, 4b have been milled out. In this case, the cutouts 4a, 4b have been driven forward, for example by milling, to such an extent that the circular slot 3a is partially interrupted to form a continuous air gap, for example 5a. As a result, regions which are fitted with pole surfaces form free-standing pole surface rings 6a and 6b which continue to be connected to one another only by means of the webs 7a, 7b.

FIG. 1b shows a plurality of connecting webs 7a, 7b, the armature disk having a total of three said connecting webs. Said connecting webs connect the outer pole surface ring 6a to the inner pole surface ring 6b at the rear of the armature disk 1. In FIG. 1b, the illustrated section runs through a web 7b along the cylindrical axis. The sectional illustration shows, in this case, that cutting the circular slot 3a in the friction contact surface causes all the webs 7a, 7b to move toward the interior of the armature disk by a distance with corresponds exactly to the depth t of the cut in the slot 3a. The pole surfaces 2a-2d of the armature disk constitute magnetic dipoles because they receive the magnetic flux from a pole surface of a rotor in order to pass on said magnetic flux to an adjacent pole surface of a rotor, which adjacent pole surface is magnetically isolated by a slot. Guidance of the magnetic flux can therefore be improved by the pole surface being slightly recessed in the region which is situated opposite the circular slot between the pole surfaces of a rotor. Recessed portions 8a, 8b of this kind are depicted in the pole surface rings 6a, 6b. In comparison with the depth t of the circular slot 3a, the depth v of the recessed region in the pole surface rings 6a, 6b is very much smaller since the magnetic flux must not be impeded by this measure.

However, a proportionally increasing cross section in the form of a cylindrical casing is available to the magnetic flux as the radius increases. Therefore, the thickness of the pole surface rings 6a, 6b can be accordingly reduced toward the outside by material being removed, for example by milling, from the rear. The pole surface ring 6a of the armature disk 1 therefore has a lower material thickness than the pole surface ring 6b.

FIGS. 2a and 2b show a rotor 9 which can be produced using the method according to the invention. The friction contact surface 10 of the rotor 9 has a similar structure to that of the armature disk 1 in FIG. 1a. Two circular slots 11a and 11b which are cut in the friction contact surface 10a-10d to a depth s divide the friction contact surface into three pole surface rings 12a, 12b and 12c, with the middle pole surface ring 12b having a circular recessed portion 13 for guiding the magnetic flux between the two pole surfaces 10b and 10c.

The rotor 9 has a total of six webs, four of said webs 14a, 14b, 14c, 14d being at least partially illustrated in FIG. 2b. Said webs are partially produced, for example, by milling the cutouts 15a, 15b, 15c. The rotor also has a total of six cutouts, three cutouts 15a-15c from amongst said cutouts being shown in FIG. 2b. Comparison of FIGS. 1b and 2b clearly shows the possibility of matching the shape of the cutouts 4a, 4b or 15a-15c and the webs 7a, 7b or 14a-14d in the rear of the friction surface elements by milling machining to meet specific mechanical and magnetic requirements.

In the cutouts 15a-15c, the material is removed to such an extent that air gaps 16a, 16b which continue from the friction contact surface to the rear are produced outside the region of the webs 14a-14d. The sectional illustration along the rotor axis runs through the two webs 14a, 14d and shows that all the webs 14a-14d between the pole surface rings 12a-12c are at a corresponding distance s from the friction contact surface on account of the cut of the circular slots 11a 11b.

The view in FIG. 2b shows the connecting webs 14a-14d of the rotor and the U-shaped ring channel which is surrounded by the inner cylindrical wall 17 and the outer cylindrical wall 18. The annular channel is provided for holding the coil turns of a solenoid in a contact-free manner. The inner wall 17 and the outer wall 18 bundle the magnetic flux which is generated by the solenoid through which current flows and direct said magnetic flux to the region of the friction contact surface. In order to surround the coil as closely as possible, but without contact, these walls 17, 18 are preferably produced by lathe machining. The depth of the U-shaped channel and therefore the lathe machining in this region are limited by the dimensions and, in particular, by the required height h of the connecting webs 14a-14d.

The invention claimed is:

1. A method for producing clutch and/or brake friction disks for electromagnetic clutches and/or electromagnetic brakes having at least one friction surface element through which a magnetic field flows, comprising the steps of: cutting at least one circular slot by lathe machining the at least one friction surface element from a friction contact surface toward a surface opposite to the friction contact surface to define at least a first and a second pole surface ring, one on each side of the at least one circular slot;

and forming at least two webs which connect on the surface opposite to the friction contact surface, wherein the at least two webs connect the first pole surface ring to the second pole surface ring such that the at least one circular slot cut from the friction contact surface is interrupted by the at least two webs to form continuous air gaps between the at least two webs.

2. The method as claimed in claim 1, wherein an axial thickness of magnetically isolated parts of the at least one friction surface element is determined at least predominantly by the at least one circular slot.

3. The method as claimed in claim 1, wherein magnetic isolation in the radial direction of adjacent parts of the at least one friction surface element is substantially produced by a space in the at least one circular slot cut, which the space is singly contiguous in an axial direction from the friction contact surface as far as the webs.

4. The method as claimed in claim 1, wherein the at least one friction surface element is partially cut out from a rear face.

5. The method as claimed in claim 1, wherein a cutout from a rear face penetrates so far that material of the at least one friction surface element is interrupted as far as the cut slot.

6. The method as claimed in claim 1, wherein the step of cutting at least one circular slot comprises cutting two concentric slots in the at least one friction surface element in order to define a further pole surface ring in the friction contact surface between the two concentric slots.

7. The method as claimed in claim 6, wherein the two concentric slots are produced with a uniform depth.

8. The method as claimed in claim 1, wherein a radial sectional profile on that side which is averted from the friction contact surface is U-shaped.

9. The method as claimed in claim 1, wherein physical geometric structures which are opposite the friction contact surface are pre-formed in a blank of the disks with a protruding volume of material by means of casting, extrusion or milling processes, and the blank is then subjected to the cutting and forming step.

10. The method as claimed in claim 1, wherein material depth of the at least first and second pole surface rings is reduced from the friction contact surface by lathe machining in a region which is opposite the friction contact surface.

11. The method of claim 1, wherein the forming step comprises removing material from the surface opposite to the friction contact surface to define the at least two webs.

* * * * *